United States Patent [19]

Spatafora et al.

[11] Patent Number: 5,105,930
[45] Date of Patent: Apr. 21, 1992

[54] METHOD AND DEVICE FOR SUCCESSIVELY FEEDING FLAT PRODUCTS

[75] Inventors: Mario Spatafora; Antonio Gamberini, both of Bologna, Italy

[73] Assignee: G.D Società per Azioni, Bologna, Italy

[21] Appl. No.: 534,517

[22] Filed: Jun. 6, 1990

[30] Foreign Application Priority Data

Jun. 20, 1989 [IT] Italy .................... 3526 A/89

[51] Int. Cl.⁵ .......................... B65G 47/12
[52] U.S. Cl. ........................ 198/453; 198/580; 198/609
[58] Field of Search ............ 198/391, 396, 443, 453, 198/580, 954, 609

[56] References Cited

U.S. PATENT DOCUMENTS

| | | | |
|---|---|---|---|
| 3,224,553 | 10/1965 | Campbell | 198/443 X |
| 3,578,094 | 5/1971 | Henry et al. | 198/443 X |
| 3,625,346 | 12/1971 | Holman | 198/609 |
| 3,730,386 | 5/1973 | Monsees | 198/444 |
| 4,037,710 | 7/1977 | Brutcher | 198/443 |
| 4,175,654 | 11/1979 | Lodge | 198/391 X |
| 4,844,240 | 7/1989 | Hütter et al. | 198/443 X |

FOREIGN PATENT DOCUMENTS 1272872  5/1972  United Kingdom .

Primary Examiner—Joseph E. Valenza
Attorney, Agent, or Firm—Marshall, O'Toole, Gerstein, Murray & Bicknell

[57] ABSTRACT

A method and device for successively feeding flat products, i.e. flat slab-shaped products such as sweets or biscuits, from an input container to a user machine, whereby the products are fed in bulk, and in excess of the capacity of the user machine, to an aligning conveyor by which they are fed successively, arranged flat and aligned with one another, to the input of a metering device, which feeds them successively to the input of the user machine in an amount equal to the capacity of the same; any excess products fed to the input of the metering device being detoured onto a recirculating conveyor.

6 Claims, 2 Drawing Sheets

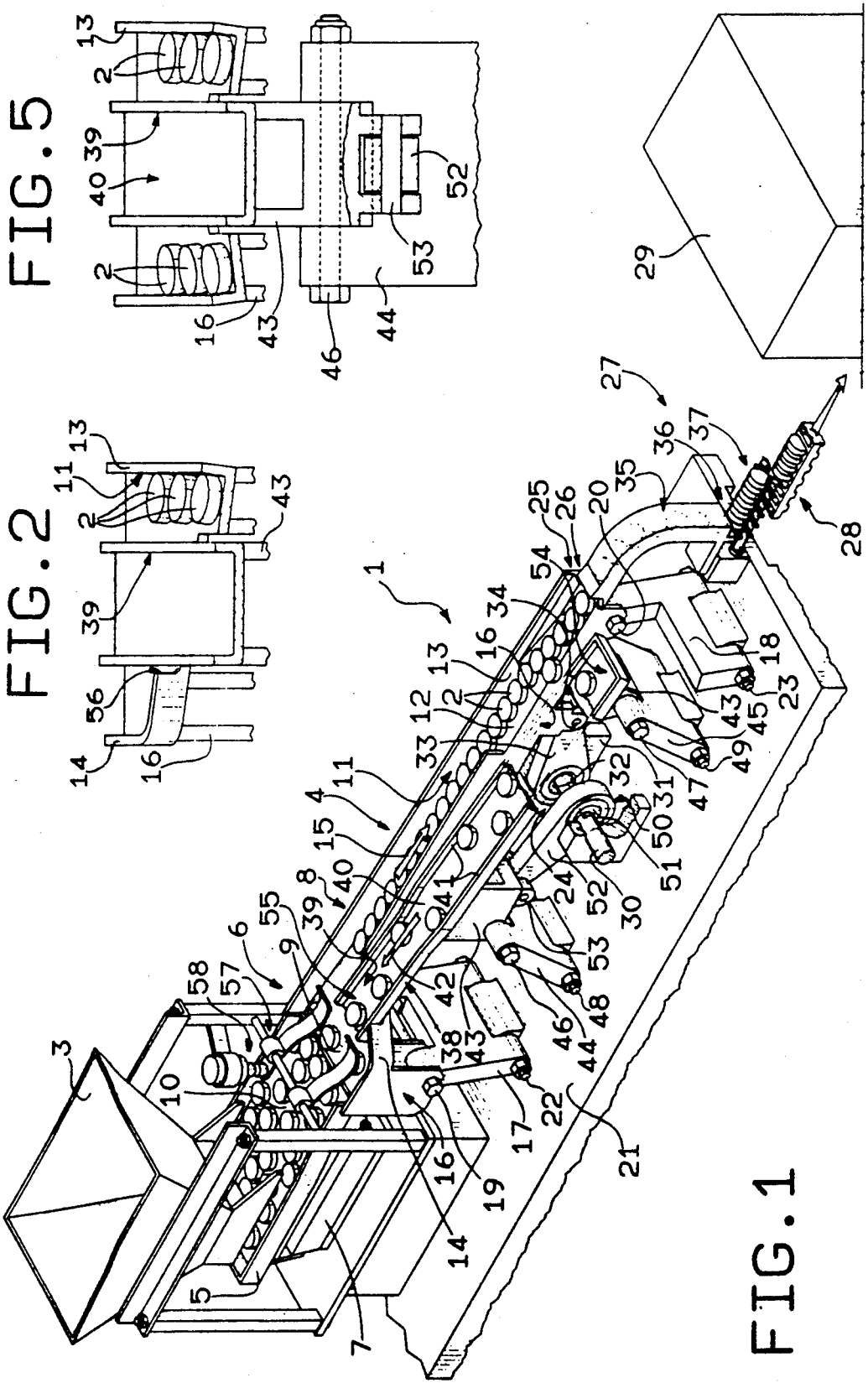

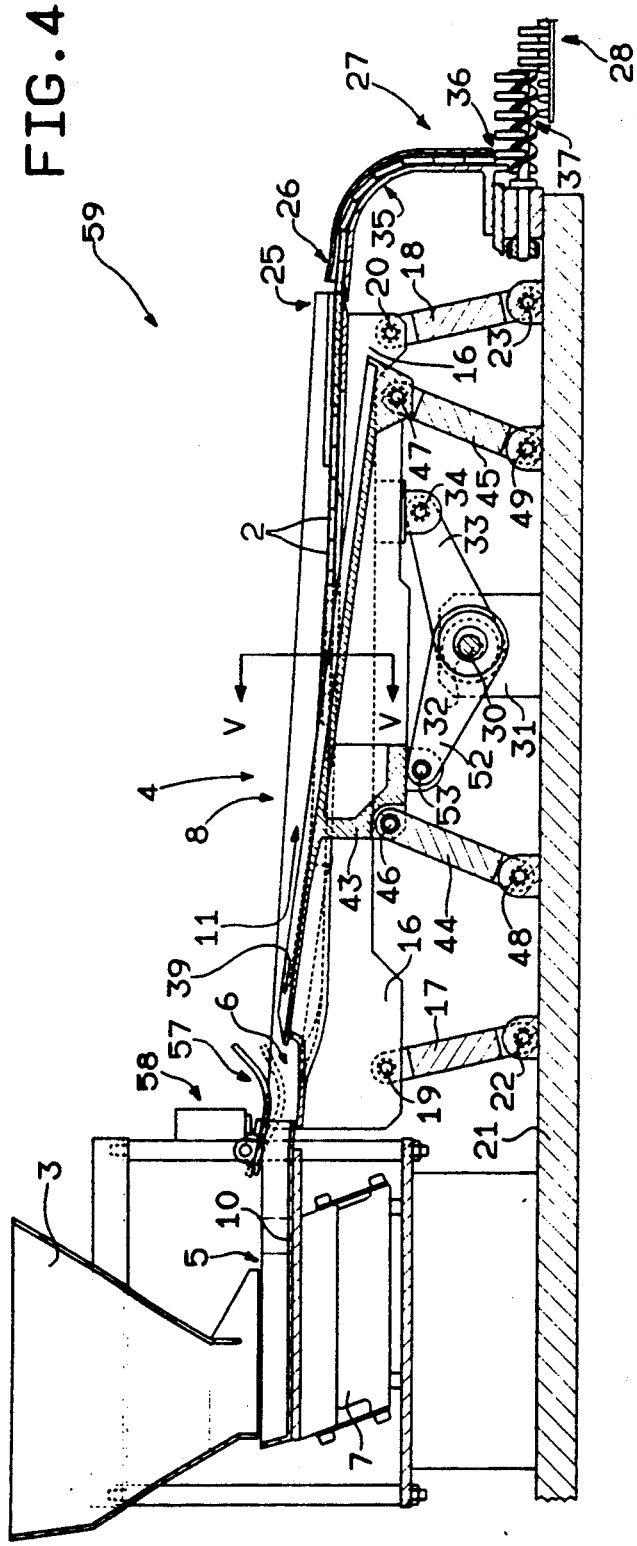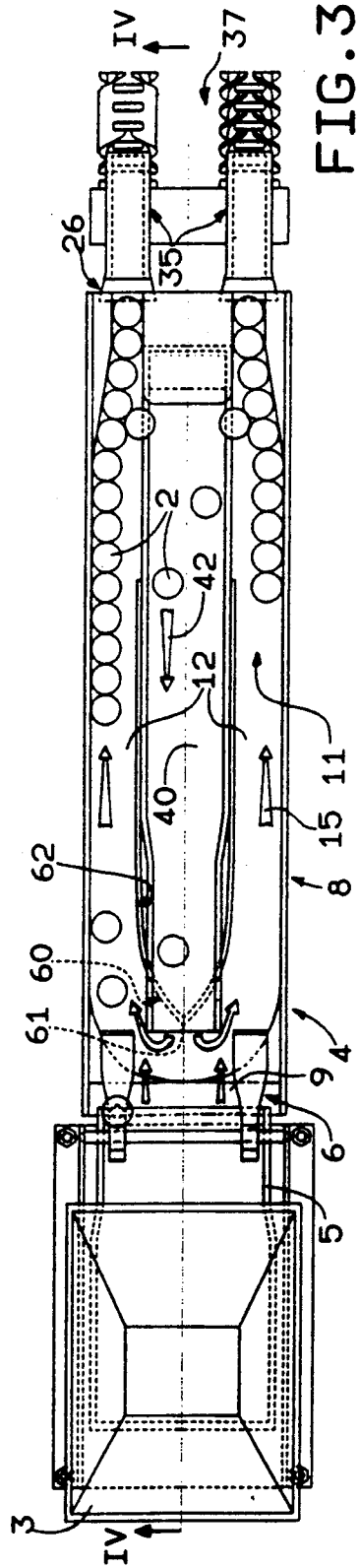

METHOD AND DEVICE FOR SUCCESSIVELY FEEDING FLAT PRODUCTS

BACKGROUND OF THE INVENTION

The present invention relates to a method for successively feeding flat products on to a user machine, in particular a packing machine.

The present invention may be employed to advantage by the food industry for forming groups of sweets, biscuits or similar products upstream from a packing machine.

The food industry is known to employ manufacturing, e.g. sweet manufacturing, machines at the output of which the flat products coming off the machine are fed in bulk on to a device by which they are fed on to a wrapping machine.

Said feed devices, such as the one referred to in Italian patent application No. 3481A/88, U.S. Pat. No. 5,058,725 being based thereon, usually comprise an input container designed to receive the products in bulk and feed them, still in bulk, on to a distributor usually consisting of a vibratory tray, the output end of which communicates with the input end of an aligning device usually comprising at least one vibratory channel. Said channel slopes slightly downwards, and provides for lining up the products in a neatly arranged row and feeding them successively on to a pocket type conveyor at the packing machine input through a transfer device designed to arrange the products in such a manner as to form, on the input conveyor, groups of products, each comprising a continuous sequence of a given number of products arranged on edge and substantially side by side.

One of the major drawbacks of known feed devices of the aforementioned type is the difficulty encountered in continually adapting product flow to the frequently variable output speed of the packing machine, and in obtaining, for any output speed and at least along the output end portion of said vibratory channel, a continuous line of products arranged side by side and contacting one another. Such a product arrangement, at least immediately upstream from the transfer device input, is essential for filling all the pockets on the packing machine input conveyor, and so preventing the formation and subsequent rejection of incomplete groups. To overcome this drawback, various steps have been taken on known feed devices of the aforementioned type, such as providing the vibratory channels with sophisticated electronic control equipment designed to vary the vibration frequency of the channels in such a manner as to adapt the traveling speed of the products to the output speed of the packing machine; and employing relatively long vibratory channels enabling any gaps between adjacent products to be gradually closed as the products travel along the channels.

Both the above provisions, however, have simply resulted in relatively cumbersome, high-cost, poorly reliable feed devices, which nevertheless fail to provide for fully eliminating the gaps between adjacent products in the vibratory channels. Also because continual adjustment of the vibration speed of the channels and, consequently, of the traveling speed of the products along the same, in itself results in the formation of gaps between adjacent products. Moreover, the extra length of the vibratory channels automatically increases the time the products are subjected to vibration and, consequently, susceptible to breakage.

As yet, it is practically impossible to run a known feed device of the aforementioned type without the continual assistance of an operator for manually closing any gaps between adjacent products traveling along the vibratory channels, and picking out any broken products which might impede throughout.

SUMMARY OF THE INVENTION

The aim of the present invention is to perfect the known method whereby products are fed on to a user machine, so as to eliminate the above drawbacks.

With this aim in view, according to the present invention, there is provided a method of successively feeding flat products, i.e. flat slab-shaped products, such as sweets or biscuits, from an input container to a user machine, whereby said products are fed in bulk to an aligning device by which they are aligned and fed successively to the input of a transfer device for transferring said products to the input conveyor of said user machine; characterized by the fact that said products are fed by said aligning device to said transfer device in a quantity in excess of the capacity of said user machine; said transfer device acting as a metering device for supplying said user machine with a quantity of said products identical to the instantaneous capacity of said user machine, the excess products being detoured on to a recirculating device.

The present invention also relates to a device implementing the above method.

According to the present invention, there is also provided a device for successively feeding flat products, i.e. flat slab-shaped products, such as sweets or biscuits, to a user machine; said device comprising an input container; an aligning device designed to receive said products in bulk from said input container; an input conveyor to said user machine; and a transfer device for successively transferring said products from said aligning device to said input conveyor; characterized by the fact that said aligning device is designed to supply said transfer device with a first substantially constant stream of aligned products; and that said transfer device is a metering device designed to supply said user machine with second stream of products smaller than said first stream and identical to the instantaneous capacity of said user machine; a recirculating device being provided for continually receiving the portion of said first stream in excess of said second stream.

BRIEF DESCRIPTION OF THE DRAWINGS

The present invention will be described by way of example with reference to the accompanying drawings, in which:

FIG. 1 shows a schematic view in perspective of a first embodiment of feed device in accordance with the present invention;

FIG. 2 shows a larger-scale view in perspective of a detail in FIG. 1;

FIG. 3 shows a plan view of a second embodiment of the device according to the present invention;

FIG. 4 shows a section along line IV—IV in FIG. 3;

FIG. 5 shows a section along line V—V in FIG. 4.

DETAILED DESCRIPTION OF THE INVENTION

Number 1 an FIG. 1 indicates a feed device for feeding flat products consisting, in the example shown, of round sweets 2.

Device 1 comprises an input container or feedbox 3, and an aligning device 4 designed to receive sweets 2 in bulk from feedbox 3 via a feed tray 5 located between feedbox 3 and the input end 6 of aligning device 4. Tray 5 is connected to a vibratory device 7 by which it is vibrated at a variable frequency specified in more detail later on.

Aligning device 4 comprises a vibratory conveyor 8 in turn comprising an input portion defined by substantially flat plate 9 located beneath an output plate 10 of tray 5 and having, on the opposite side to that facing plate 10, a tapered output end blending with the input of a channel 11.

Channel 11 presents a substantially L-shaped section, and is defined by an elongated bottom plate 12 sloping slightly downwards from the end facing plate 9 and sloping transversely downwards towards an outer side 13 extending along the outer lateral edge of plates 9 and 12 and integral with the same. On the opposite side to side 13, plate 9 is defined by a second curved side 14 terminating at the input of channel 11.

Channel 11 provides for feeding a stream of sweets 2 aligned in the direction of arrow 15, and arranged flat, contacting the upper surface of plate 12 and laterally contacting side 13 by virtue of the transverse slope of plate 12.

Vibratory conveyor 8 also comprises a supporting frame 16 extending beneath and integral with plate 12, and constituting the connecting rod of an articulated parallelogram comprising two cranks 17 and 18 connected in articulated manner, on one side, to the opposite ends of frame 16 via respective pins 19 and 20, and, on the other, to a plate or base 21 via respective pins 22 and 23 parallel to pins 19 and 20 and arranged transversely in relation to the direction of arrow 15.

Vibratory conveyor 8 also comprises a vibratory device 24 connected to channel 11 so as to vibrate it at a given constant frequency and feed sweets 2, aligned on plate 12, to the output portion 25 of plate 12 facing the calibrated inlet 26 of a transfer device indicated as a whole by 27 and designed to successively transfer sweets 2 to a known pocket type input conveyor 28 of a user machine 29.

As shown in FIG. 1, vibratory device 24 comprises a powered shaft 30 designed to turn about its axis at a given constant speed. Shaft 30 is connected in rotary manner to support 31 integral with base 21, and extends transversely in relation to the direction of arrow 15. Vibratory device 24 also comprises an eccentric disc 32 fitted on to shaft 30 and acting as the crank of a connecting rod 33 connected to frame 16 via a pin 34 parallel to shaft 30.

Transfer device 27 comprises channel 35 curved downwards substantially 90° and supported on base 21 in a manner not shown. The tapered inlet of channel 35 coincides with inlet 26 of device 27, and is designed to receive sweets 2, still arranged flat, and feed them to an outlet 36 lying in a substantially vertical plane perpendicular to base 21 and arrow 15.

Transfer device 27 provides for turning sweets 2 from the flat position on plate 12 into an unright position at outlet 36, and for feeding them, on edge, to a known screw conveyor 37 extending beneath outlet 36 of channel 35, substantially parallel with arrow 15, and designed to feed sweets 2, still in the unright position, on to conveyor 28.

Aligning device 4 comprises a further vibratory conveyor 38 constituting a recirculating device, as described in more detail later on. Conveyor 38 is located beside vibratory conveyor 8, and comprises a channel 39 extending between input plate 9 of conveyor 8 and transfer device 27.

Channel 39 presents a substantially U-shaped section, and is defined by an elongated bottom plate 40 sloping slightly upwards towards tray 5 and having two sides 41 along its longitudinal edges. Channel 39 constitutes a recirculating channel for a row of sweets 2 aligned in the traveling direction indicated by arrow 42, substantially opposite that of arrow 15, and lying horizontally on the upper surface of plate 40 between sides 41.

Vibratory conveyor 38 also comprises a supporting frame 43 extending beneath and integral with plate 40, and constituting the connecting rod of an articulated parallelogram comprising two cranks 44 and 45 connected in articulated manner on one side to the opposite ends of frame 43 via respective pins 46 and 47 and, on the other, to base 21 via respective pins 48 and 49 parallel to pins 46 and 47 and arranged crosswise in relation to the direction of arrow 42.

Vibratory conveyor 38 also comprises a vibratory device 50 connected to channel 39 so as to vibrate it at given constant frequency and so feed sweets 2, aligned on plate 40, to plate 9.

Vibratory device 50 shares shaft 30 with vibratory device 24, and comprises an eccentric disc 51 fitted on to shaft 30, substantially in phase opposition in relation to disc 32, and acting as the crank of a connecting rod 52 connected to frame 43 via a pin 53 parallel to shaft 30.

As shown in FIGS. 1 and 2, channel 39 comprises an input portion 54 extending beneath output portion 25 of channel 11; and an output portion 55 located at a higher level than channel 11 and which, through an opening 56 in side 14, terminates on top of plate 9, which thus acts as a junction at which sweets 2 are transferred from the output of conveyor 38 to the input of conveyor 8. Between input portion 54 of channel 39 and output portion 25 of channel 11, a similar junction is formed, at which any sweets 2 failing to enter inlet 26 drop down from channel 11 to channel 39.

Over the junction defined by plate 9, provision is made for an oscillating device 57 designed to assume, over plate 9, an angular position depending on the instantaneous level of sweets 2 fed to the input of channel 11. Device 57 forms part of an induction control device 58 designed to control the vibration frequency of device 7 and so maintain sweets 2 on plate 9 substantially at a given level.

In actual use, the capacity of machine 29, and therefore the speed of conveyor 28 and sweets 2 traveling along channel 35, may vary instantaneously, whereas conveyor 8, vibrating at constant frequency, provides for feeding a substantially constant stream of sweets 2 along channel 11.

To prevent gaps forming between adjacent sweets 2 traveling along plate 12 in the direction of arrow 15, as a result of a change in the operating speed of machine 29 or irregular throughout of sweets 2 along channel 11, the vibration frequency of device 24, and consequently also device 50, is so regulated as to ensure, along channel 11, a constant stream of sweets 2 in excess of (or at least equal to) the maximum capacity of machine 29.

As the number of sweets 2 successively entering inlet 26 is limited to the capacity of machine 29, any excess sweets 2 fed along channel 11 slow down and accumulate on portion 25 of channel 11, thus automatically closing any gaps between adjacent sweet 2, and forming an unbroken stream which is fed continuously into curved channel 35 of transfer device 27. Transfer device 27 thus acts as a metering device for letting through only the number of sweets 2 required at each instant by machine 29.

Any excess sweets 2 prevented from entering inlet 26 are expelled laterally by the pressure exerted from behind by sweets 2, and drop automatically on to input portion 54 of channel 39, by which they are fed back to plate 9. The number of sweets 2 fed, at each instant, to the inqut of channel 11 therefore equals the sum of sweets 2 fed on to plate 9 by tray 5 on the one hand and recirculating channel 39 on the other. To prevent an overaccumulation of sweets 2 on plate 9, the level on plate 9 is regulated by control device 58, which provides for continuously varying the frequency of vibratory device 7 in known manner, and so maintaining sweets 2 on plate 9 at a given constant level.

As regards vibratory devices 24 and 50, it should be pointed out that, by virtue of eccentric discs 32 and 51 working substantially in phase opposition, system 24-50 is a substantially balanced system enabling relatively high operating frequencies, which would be unfeasible if applied to known feed devices, and which provide for ensuring smooth, gapfree flow of sweets 2 along channel 11.

FIGS. 3 to 5 show a second feed device 59 functionally identical to device 1 and the component parts of which are indicated using the same numbering system.

The only difference between devices 59 and 1 is that device 59 comprises two parallel vibratory conveyors 8 arranged on opposite sides of recirculating conveyor 38. Channels 11 of said two conveyors 8 supply respective transfer devices 27 assigned to respective conveyors 28 (usually connected so as to supply the same conveyor), and extend from opposite lateral ends of plate 9. Plate 9 is wider than on device 1, and presents, on the side facing the output end of conveyor 38, a substantially V-shaped side 60, the apex of which forms a dividing wedge 61 located beneath output portion 55 of channel 39 and along the central longitudinal axis of plate 9, and the arms of which extend along the diverging inner lateral edges of the input portion of respective plates 12. The inner lateral edges of the remaining part of plates 12 are substantially straight, and extend in the direction of arrow 15 and at a given distance from each other, so as to define, between the two conveyors 8, an opening 62 for conveyor 38.

On device 59, discs 32 of vibratory devices 24 are both mounted on shaft 30 in phase with each other and substantially in phase opposition in relation to disc 51 of vibratory device 50.

We claim:

1. A method of successively feeding flat products (2), i.e. flat slab-shaped products, such as sweets or biscuits, from an input container (3) to a user machine (29) comprising:

feeding the products (2) in bulk from the input container (3) to a feed tray (5);

feeding the products (2) in bulk from the feed tray (5) to a product (2) aligning device (4) having an input end and an output end;

feeding the products (2) from the feed tray (5) to the input end of said aligning device (4) by vibrating the feed tray (5) at a third variable frequency controlled by a device (58) for detecting the amount of said products (2) present, at each instant, at a second junction communicating with the aligning device (4) input end;

the aligning device comprising a first vibratory conveyor (8) having at least one channel (11) which communicates with the said input end and the said output end;

vibrating the first vibratory conveyor (8) at a first given constant frequency whereby the products (2) are fed by the first vibratory conveyor (8) from the aligning device (4) input end to the channel (11) in which the products (2) are aligned and fed to the aligning device (4) output end;

successively feeding the aligned products (2) from the aligning device (4) output end to the input of a transfer device (27) thereby transferring said products (2) to an input conveyor (28) of the user machine (29); with said products (2) being fed by said aligning device (4) to the transfer device (27) in a quantity in excess of the capacity of said user machine (29);

the transfer device (27) functioning as a metering device and supplying the user machine (29) with a quantity of the products (2) identical to the instantaneous capacity of the user machine (29);

withdrawing excess products (2) from the aligning device (4) output end through a first junction communicating with said output end and feeding the products (2) to a second vibratory conveyor (38), of a recirculating device, vibrating at a second given constant frequency identical to said first frequency but substantially in phase opposition in relation to the same; and feeding the excess products (2) by the second vibratory conveyor (38) to a second junction communicating with the input end of the aligning device (4).

2. A device for successively feeding flat products (2), i.e. flat slab-shaped products, such as sweets or biscuits, or a user machine (29); said device comprising:

an input container (3);

a feed tray (5) positioned to receive products (2) in bulk from the input container (3);

a product (2) aligning device (4) having a product (2) input end communicating with the tray and a product (2) output end comprising a first vibratory conveyor (8) which includes at least one channel (11) for feeding a stream of aligned products (2) from the tray (5) in a first given traveling direction, and first vibratory means (24) being connected to said first vibratory conveyor (8) for vibrating it at a first given constant frequency;

a transfer device (27) for successively transferring products (2) from the aligning device (4) output end to an input conveyor (28) communicating with a user machine (29);

the aligning device (4) being designed to supply said transfer device (27) with a first substantially constant stream of aligned products (2);

the transfer device (27) constituting a metering device designed to supply said user machine (29) with a second stream of products (2) smaller than said first stream and identical to the instantaneous capacity of the user machine (29);

a recirculating device (38) for continually receiving the portion of said first stream in excess of said second stream;

the recirculating device (38) extending from a first junction, communicating with the output end of said aligning device (4), to a second junction communicating with the input end of said aligning device (4);

third vibratory means (7) connected to the tray (5) for vibrating it at a third variable frequency and a detecting device (58) assigned to the third vibratory means (7) for controlling the value of said third frequency as a function of the amount of the products (2) present, at each instant, at the second junction;

the recirculating device comprising a second vibratory conveyor (38) with second vibratory means (50) being connected to said second vibratory conveyor (38) for vibrating it at a second given constant frequency identical to said first frequency but substantially in phase opposition in relation to the same.

3. A device as claimed in claim 2, characterized by the fact that said first and second vibratory means (24, 50) comprise a common drive shaft (30) turning about its axis at a given constant speed and extending substantially crosswise in relation to said first traveling direction; and respective eccentric discs (32, 51) fitted, substantially in phase opposition, on to said shaft (30).

4. A device as claimed in claim 3, characterized by the fact that said aligning device (4) comprises two feed channels (11) extending between said first and second junctions; said recirculating device (38) being designed to feed any excess products (2) in a second direction opposite said first direction, and being located between said two feed channels (11).

5. A method of successively feeding flat products (2), i.e. flat slab-shaped products, such as sweets or biscuits, comprising:

feeding the products (2) in bulk from an input container (3) to a feed tray (5);

feeding the products (2) in bulk from the feed tray (5) to a product (2) aligning device (4) having an input end and an output end;

the aligning device comprising a first vibratory conveyor (8) having at least one channel (11) which communicates with the said input end and the said output end;

feeding the products (2) from the feed tray (5) to the input end of said aligning device (4) by vibrating the feed tray (5) at a variable frequency controlled by a device (58) for detecting the amount of said products (2) present, at each instant, at the aligning device (4) input end;

vibrating the first vibratory conveyor (8) at a first given constant frequency whereby the products (2) are fed by the first vibratory conveyor (8) from the aligning device (4) input end to the channel (11) in which the products (2) are aligned and fed to the aligning device (4) output end;

successively feeding the aligned products (2) from the aligning device (4) output end to the input of a transfer device (27) thereby transferring said products (2) to an input conveyor (28) of a user machine (29); with said products (2) being fed by said aligning device (4) to the transfer device (27) in a quantity in excess of the capacity of said user machine (29);

the transfer device (27) functioning as a metering device and supplying the user machine (29) with a quantity of the products (2) identical to the instantaneous capacity of the user machine (29); and withdrawing excess products (2) from the aligning device (4) output end through a first junction communicating with said output end; and feeding the excess products (2) by a second vibratory conveyor (38) to a second junction communicating with the input end of said aligning device (4).

6. A device for successively feeding flat products (2), i.e. flat slab-shaped products, such as sweets or biscuits, comprising:

an input container (3);

a feed tray (5) positioned to receive products (2) in bulk from the input container (3);

a product (2) aligning device (4) having a product (2) input end communicating with the feed tray and a product (2) output end for receiving products (2) from the feed tray (5) and aligning them in a first given traveling direction to provide a substantially constant stream of aligned products;

vibratory means (7) connected to the feed tray (5) for vibrating it at a variable frequency and a detecting device (58) assigned to the said vibratory means (7) for controlling the valve of said frequency as a function of the amount of the products (2) present at the aligning device (4) input end;

the aligning device (4) comprising a vibratory conveyor (8) which includes at least one channel (11) for receiving products (2) from the tray and aligning them;

vibratory means (24) connected to the vibratory conveyor (8) for vibrating it at a given constant frequency;

a transfer device (27) for successively transferring products (2) from the aligning device (4) output end to an input conveyor (28) communicating with a user machine (29);

the aligning device (4) being designed to supply said transfer device (27) with a first substantially constant stream of aligned products (2);

the transfer device (27) constituting a metering device designed to supply said user machine (29) with a second stream of products (2) smaller than said first stream and identical to the instantaneous capacity of the user machine (29);

a product (2) recirculating device (38) for continually receiving the portion of said first stream in excess of said second stream; and the recirculating device (38) extending from a first junction, communicating with the output end of said aligning device (4), to a second junction communicating with the input end of said aligning device (4).

* * * * *